United States Patent [19]

Rudel

[11] Patent Number: 5,178,894

[45] Date of Patent: Jan. 12, 1993

[54] HIGH NON-FAT MILK CONTENT BREAD PRODUCTS HAVING IMPROVED KEEPING QUALITIES

[75] Inventor: Harry W. Rudel, Elizabeth, N.J.

[73] Assignee: Silvia P. Rudel, Elizabeth, N.J.

[21] Appl. No.: 766,421

[22] Filed: Sep. 26, 1991

[51] Int. Cl.$^5$ .................... A21D 10/00; A21D 13/00
[52] U.S. Cl. .................................... 426/549; 426/19; 426/23
[58] Field of Search .................... 426/62, 549, 18, 19, 426/23

[56] References Cited

U.S. PATENT DOCUMENTS

| | | | |
|---|---|---|---|
| 3,271,164 | 9/1966 | Andt | 426/62 |
| 3,411,919 | 11/1968 | Glabe et al. | 426/26 |
| 3,561,974 | 2/1971 | Hansen | 426/23 |
| 4,395,426 | 7/1983 | Fan | 426/62 |
| 4,481,222 | 11/1984 | Fan | 426/62 |

OTHER PUBLICATIONS

"Baking Production Technology", American Institute of Baking, Baltimore, Md. (Conference of Nov. 7-9, 1988), pp. 1-5 to 1-6.

*Primary Examiner*—Joseph Golian
*Assistant Examiner*—Leslie Wong
*Attorney, Agent, or Firm*—Lerner, David, Littenberg, Krumholz & Mentlik

[57] ABSTRACT

A composition for preparing a bread product containing a wheat flour having a protein content between about 10% and about 17% by weight and about 24% to about 48% by weight per 100 parts of flour of high heat non-fat dry milk solids, and optionally including one or more vegetable gums to improve the loaf volume, shape and structural strength of the bread product. The preparation of leavened doughs from the composition and baked products from the leavened doughs are also disclosed.

16 Claims, No Drawings

HIGH NON-FAT MILK CONTENT BREAD PRODUCTS HAVING IMPROVED KEEPING QUALITIES

BACKGROUND OF THE INVENTION

The present invention relates to bread products having improved keeping qualities containing high levels of non-fat dry milk that substantially increase the quantity and quality of the bread's protein and calcium content. In particular, the present invention relates to bread products having improved keeping qualities, based upon flours having wheat protein contents of about 10% to about 17% by weight and containing heat treated non-fat dry milk in amounts of 24% to 48% by weight per 100 parts of flour.

Bread and milk are basic foods for much of the Western world. The amino-acid makeup of their individual proteins are complimentary and when combined in the correct proportions produce an over-all amino acid pattern similar to the 1973 recommended standard for protein quality of the Food Administration Organization (FAO) of the World Health Organization (WHO). Although bread or bread products are universally eaten, milk is consumed less consistently throughout society. Its consumption is particularly a problem in growing children, adolescent girls and adult women, groups where nutritionally complete proteins and calcium, provided by milk, are essential to bone development and maintenance.

The incorporation of milk usually as non-fat dry milk (NFDM) into bread can enhance the nutritional value of the final product, due to its content of casein and the whey proteins. However, U.S. Pat. No. 3,411,919 to Glabe discloses that these proteins, particularly the whey proteins, have a deleterious effect on bread structure, decreasing loaf volume and creating a dense unsatisfactory crumb. This necessitates the use of a NFDM which has been specially heat treated to denature the whey proteins. Heat treated NFDM is known in the art as "high heat" NFDM, which is described in U.S. Pat. No. 4,395,426 to Fan as milk that has been subjected to temperatures higher than normal pasteurization temperatures prior to drying so as to partially denature the milk proteins.

As noted in U.S. Pat. No. 4,395,426, "high heat" NFDM is conventionally used in yeast leavened baked goods. Even with high heat treatment it is generally accepted that the amount of NFDM should not exceed 8.2%, and usually not more than 6%, based upon the flour weight if satisfactory loaf volume is to be maintained, as disclosed by "Baking Production Technology," American Institute of Baking, Baltimore, Md., Conference of Nov. 7-9, 1988. This limits the amount of NFDM which can be incorporated into bread to about 23 g or 240 cc (8 ounces) skim milk equivalent in a standard loaf (454 g or 1 lb.). Considering 6 slices of bread (150 g) as an average daily consumption, this amount of added milk supplies only 6% of the recommended daily allowance (RDA) of protein and 10% calcium, relatively insignificant amounts of these nutrients.

U.S. Pat. No. 3,411,919 discloses that low quantities of NFDM in bread dough detracts substantially from the flavor of the resulting baked bread, as well as from its crust color, crumb texture and quality, particularly in the "no-time" process, a straight dough method with a fermentation time of one hour or less and the "continuous-mix" process, both of which sacrifice flavor for a shortened fermentation time. However, in these methods, once levels exceed 1% of the flour weight, there occurs a significant reduction in bread volume and deterioration of loaf shape, with weakened side walls. At the same time, levels of NFDM of less than 3% based upon flour weight will have little effect on the flavor of the finished product.

Andt, U.S. Pat. No. 3,271,164, discloses a continuous process of bread making in which there is added to the dough about 4% of NFDM from about 0.1% to 0.9% karaya gum and from about 0.02% to about 0.1% of a material selected from algins and carrageenans, all percentages being by weight of the flour. The aforementioned U.S. Pat. No. 3,411,919, describes a continuous-mix bread containing NFDM in amounts from 2-6% of the flour weight in which the loaf volume, shape and structural strength, ordinarily weakened by NFDM, are improved through the incorporation of 0.1% to 1.0% hydroxylated phosphatide, and 0.01% to 0.15% of carrageenan extract by flour weight. Although this amount of NFDM addition exceeds the accepted upper limit of 1% in the continuous-mix process, it is still a relatively small amount of milk and an insignificant contribution to the nutritional value of the bread.

The aforementioned Fan, U.S. Pat. No. 4,395,426, discloses a dry mix process for preparing bread without a kneading step, which bread contains in addition to other ingredients about 0.5 to 1.5 parts by weight per 100 parts of flour of a propylene glycol alginate and about 2 parts to 10 parts of a gum member by weight per 100 parts selected from karaya gum, guar gum, xanthan gum, high viscosity carboxymethyl cellulose, high viscosity carrageenan gum and mixtures thereof. The bread optionally contains 1 to 10 parts of high heat non-fat dry milk solids (NFDM).

Dotsenko et als., *Pishchevaya Primyshlennost*, 1, 32–33 (1987), using NFDM in amounts from 10–15%, based on the wheat flour weight, together with monoglyceride esters of diacetyl tartaric acid and the multi-enzyme complex MFK-KhP to hydrolyze the NFDM, showed improved rheological properties and binding capacities for the resulting doughs. There were no descriptions of bread products made from these doughs.

Before the process of staling was understood as it is today, the dryness associated with staled crumb of baked goods led to the use of hydrocolloidal vegetable gums as humectants or moisturizers. These agents take-up and hold water in amounts many times their own weight. As an example, the uptake of water by alginates is 26 cc/g in contrast to 1 cc/g for gluten and 0.4 cc/g for undamaged starch. It should be exphasized that these agents are not to be considered anti-stalants even though Andt calls the mixture of karaya and algins and/or carrageenans described above an additive to retard staling. Loaves treated with 0.5% of the additive showed a greater softness initially and after 96 hours when compared to control bread. However, the rate of firming, an index of staling, was similar in both groups.

Others claiming improvements in keeping qualities from hydrocolloidal vegetable gums due to moisture retention and softness include: Curtner, U.S. Pat. No. 1,534,783, Epstein, U.S. Pat. No. 1,964,940, and Ament, U.S. Pat. No. 2,158,392. Fiske, U.S. Pat. No. 1,657,116, describes a composition of gum tragicanth, 3.0%, and iodic acid, 0.0175%, based upon 100 lb of a bread flour mixture as a bread volume enhancer. Similarly, Dubois, U.S. Pat. No. 3,219,455, describes a bread additive comprising about 20–30 parts vital wheat gluten, 3–5 parts hydrophilic colloidal (carboxymethylcellulose) and 0.01–0.025 parts of an oxidizing agent (potassium bromate) based upon 1000 parts of bread flour which has the property of increasing bread volume and compressibility of breads made from said flours. Although the compressibility of loaves made with the additive is greater at 96 hours than control samples, the rate of firming of the additive containing groups is equal to or greater than the controls.

Although NFDM has beneficial effects on bread flavor and appearance, when used in proper amounts, there have been no reports that such additions alone or in combination with other ingredients delay the onset of bread staling or increase its keeping time.

SUMMARY OF THE INVENTION

One object of the present invention is to provide compositions which can be made into yeast leavened baked goods with sufficiently high levels of NFDM to substantially increase the quantity and quality of their protein and calcium contents so that a typical serving of said baked good could act as a primary source of these nutrients. It is a further object of this invention to supply leavened baked goods of superior keeping qualities with high user acceptability due to improved flavor and organoleptic properties.

It has now been discovered that the trend of heat treated NFDM to detract from loaf volume, shape and structural strength in baked goods as the amount of NFDM in doughs is increased reverses at an NFDM level of 24% based on flour weight, when flours are utilized having wheat protein contents of between about 10% to about 17%. It has also been discovered that this combination of wheat flours within the general usage range of protein content and high heat non-fat dry milk solids produces a bread product having superior keeping qualities.

Therefore, according to one embodiment of the present invention, a dry mix for preparing a bread product having improved keeping qualities is provided containing a wheat flour having a protein content between about 10% and about 17% by weight and about 24% to about 48% by weight per 100 parts of flour of high heat non-fat dry milk solids. This embodiment of the present invention also includes doughs made by the addition of water and a leavening agent to the dry mix, and baked products made from the leavened dough.

The present invention further includes the discovery that the dense crumb and lower loaf volume resulting from higher levels of high heat non-fat dry milk solids can be significantly improved by the addition of one of more vegetable gums in an amount between about 0.12% and about 1.70% by weight per 100 parts of flour. In particular, when two gums, guar and carrageenan, are combined, their effects on loaf volume are additive and better than could be obtained from the use of either gum alone in greater amounts. This embodiment of the present invention also includes doughs made by the addition of water and a leavening agent to the dry mix, and baked products made from the leavened dough.

According to another embodiment of the present invention, a dry mix for preparing a bread product having improved keeping qualities is provided containing a wheat flour having a protein content between about 10% and about 17% by weight, about 24% to about 48% by weight per 100 parts of flour of high heat non-fat dry milk solids, and about 0.12% to about 1.64% by weight per 100 parts of flour of one or more vegetable gums.

The compositions of the present invention can be used to make baked goods such as bread products using standard bakery equipment. The bread products of the present invention not only have superior nutritional properties, excellent appearance, flavor and eating qualities, but also demonstrate a retardation of staling and increased keeping time.

DETAILED DESCRIPTION OF THE PREFERRED EMBODIMENT

The dry mixes of the present invention for preparing bread products having improved keeping qualities are based on wheat flours having a protein content between about 10% and about 17% by weight. Such flours are commercially available and can be readily obtained by the ordinarily skilled artisan. Wheat flours having a protein content between about 12% and about 15% are preferred.

The compositions of the present invention combine wheat flours of commonly used protein content with high heat non-fat dry milk solids. High heat NFDM is conventionally employed in leavened baked goods and is well-known in the art. Generally, high heat NFDM is that which has been subjected to high temperature, compared to normal pasteurization temperatures, during drying so as to partially denature milk proteins. The compositions of the present invention contain from about 24% to about 48% by weight per 100 parts of flour of high heat NFDM. The compositions of the present invention preferably contain high heat NFDM in an amount between about 36% and about 48% by weight per 100 parts of flour, and more preferably contain high heat NFDM in an amount between about 40% and about 48% by weight per 100 parts of flour.

As noted above, the compositions of the present invention may optionally include one or more vegetable gums to improve the loaf volume. Vegetable gums have been used in the past as humectants or moisturizers in baked goods such as bread products. Such gums are well-known in the food art and the skilled artisan will have no problem selecting suitable gum grades from those commercially available. Examples of vegetable gums suitable for use in the present invention include guar gum, carrageenan, algins, karaya gum, and the like, and mixtures thereof. The preferred vegetable gums are guar gum and carrageenan. Most preferred is a mixture of guar gum and carrageenan.

The compositions of the present invention optionally include between about 0.12% and about 1.70% by weight per 100 parts of flour of one or more vegetable gums. Preferably, the compositions of the present invention contain between about 0.26% and about 1.40% by weight per 100 parts of flour of one or more vegetable gums.

As noted above, preferred compositions in accordance with the present invention contain a combination of guar gum and carrageenan. Preferably, between about 0.24% and about 1.0% by weight per 100 parts of flour of guar gum is present. Even more preferably, between about 0.26% and about 0.8% by weight per 100 parts of flour of guar gum is present, and most preferably about 0.53% by weight per 100 parts of flour of guar gum is present. The carrageenan is preferably present in combination with the guar gum in an amount between about 0.12% and about 0.64% by weight per 100 parts of flour. More preferably, between about 0.24% and about 0.48% by weight per 100 parts of flour of carrageenan is present. And most preferably, about 0.30% by weight per 100 parts of flour of carrageenan is present.

The compositions of the present invention can also optionally include those materials conventionally used in bread manufacturing such as crumb softeners, reducing and oxidizing agents, mineral yeast foods, and the like, with normally expected results. Oxidizing agents are well-known as conventional additives for the improvement of loaf volume. Examples of commercially employed oxidizing agents include potassium bromate, ascorbic acid, azodicarbamide (ADA), and the like, and mixtures thereof. The following levels of oxidizing agents are used commercially: potassium bromate, 40–75 ppm; ADA, 20–45 ppm; and ascorbic acid, 50–200 ppm. Two or more oxidizing agents may be used in combination, in which instance levels are employed at the lower end of the above-listed ranges.

The compositions of the present invention can then be formed into a bread product dough by combining the composition with a leavening agent and water. The dough may optionally also include a nutritive carbohydrate sweetening agent such as sugar, salt, shortening and the like.

The amount of water used should be that quantity sufficient to make the dough. The selection of the appropriate quantity of water is a conventional procedure that poses no problem to the ordinarily skilled artisan.

Leavening agents are also well-known and include yeasts and chemical leavening agents such sodium bicarbonate, baking powder (calcium acid phosphate and sodium aluminum sulfate) and tartaric acid or its potassium acid salt. The preferred leavening agent is yeast. When a chemical leavening agent is used, it should be present in an amount between about 0.75% and about 7.5% by weight per 100 parts of flour, and preferably an amount between about 1.0% and about 3.0% by weight.

The yeast may be either active dry yeast or compressed yeast. The choice depends upon the bakery and its methods of operation. Compressed yeast is used in the present invention, but the selection of appropriate yeasts pose no problems for the ordinarily skilled artisan. Compressed yeast should be added to the dough in a quantity between about 0.5% and about 5.0% by weight per 100 parts of flour, and preferably in a quantity between about 3.0% and about 4.0% by weight.

With respect to the optional dough ingredients, the nutritive carbohydrate sweetening agent includes those typical sweetening agents conventionally used in food products. Suitable sweetening agents are well-known in the art and examples of which include both monosaccharide and disaccharide sugars such as sucrose, invert sugar, dextrose, malt syrup, honey, maltose, molasses, fructose, high fructose corn syrup and corn syrup solids. Preferred sweetening agents include sucrose, dextrose, corn syrup solids and high fructose corn syrup. The sweetening agent is present in an amount between about 0% and about 12% by weight per 100 parts of flour, and preferably in an amount between about 3.0% and about 6.0% by weight.

Salt is also conventionally employed in the preparation of bread products. When utilized, the salt should be present in an amount between about 1.5% and about 2.5% by weight per 100 parts of flour, and preferably in amounts between about 1.75% and about 2.25% by weight.

Conventional shortening materials are suitable for use as the optional shortening ingredient of the dough mixtures prepared from the composition of the present invention. Such conventional shortening materials are well-known to the ordinarily skilled artisan. Either liquid or solid shortenings of animal, vegetable, marine or synthetic oil origin can be used, as well as margarines. Suitable shortening materials can be derived from, for example, soy bean oil. If utilized, the shortening should be present in an amount between about 0% and about 5.0% by weight per 100 parts of flour, and preferably in an amount between about 2.0% and about 3.0%.

Baked goods can be produced from the dry mixes of the present invention using standard bakery equipment and practices. For example, to produce dinner rolls, the wheat flour and the NFDM can be combined and dry blended and then placed into a horizontal mixer and combined with the sugar, salt, shortening, compressed yeast and sufficient water to make a dough. The ingredients are mixed at low speed for 2 minutes and at high speed (80 RPM) for 9–13 minutes. A soft elastic dough forms in the mixer, which is then transferred to an automatic dough divider and rounder. The panned dough pieces are then proofed for approximately 1 hour and baked with initial steam application at 204° C. for 12 minutes. The baked pieces are then cooled, bagged and tied. When a vegetable gum is used, it is blended with the wheat flour and NFDM before the flour and NFDM are added to the horizontal mixer and combined with the other ingredients.

It will thus be appreciated that, in accordance with the present invention, bread products may be prepared with sufficiently high levels of high heat NFDM, thereby substantially increasing the quantity and quality of the protein and calcium content of the bread. Specific embodiments of the present invention are illustrated by the following examples which are not intended to limit the scope of the invention as defined by the appended claims.

The protein percentages of the wheat flours are weight percentages. Unless otherwise indicated, the other percentages are based upon weight percent per 100 parts of wheat flour. Loaf volume is measured by specific volume, which is an inverse density measurement, measured in units of volume per given weight. In the following examples, specific volume is measured in cubic centimeters per gram.

EXAMPLES

Examples 1–4

Relationship of NFDM Content and Protein Content of Wheat Flour to Loaf Volume

Using a straight-dough method, 168 miniature loaves were prepared by the addition of salt, sugar, yeast and water to various flour mixes composed of wheat flour with a wheat protein content of 9.8% to 17.1% and non-fat dry milk (NFDM), heat treated to denature the serum proteins, (bakers grade) 6%–48%, based on wheat flour weight.

In Example 1, 42 (seven groups of six loaves) loaves were prepared by the addition of salt, sugar, yeast and water to wheat flour with a wheat protein content of 10%. In each loaf, the NFDM content varied from 0 to 48% by weight based upon 100 parts of flour, as shown in Table I. 42 loaves were similarly prepared for Examples 2–4 using wheat flours having wheat protein contents of 12.5%, 15% and 17% by weight, respectively. This is also shown in Table I.

TABLE I

| EXAMPLE | CONTROL | NFDM CONTENT | | | | | | WHEAT PROTEIN CONTENT |
|---|---|---|---|---|---|---|---|---|
| | | 6 | 12 | 24 | 36 | 42.4 | 48 | |
| 1 | 3.8 | 3.7 | 3.6 | 2.8 | 2.9 | 3.4 | 3.0 | 10 |
| 2 | 4.0 | 3.3 | 3.0 | 2.4 | 2.6 | 3.1 | 3.5 | 12.5 |
| 3 | 4.3 | 3.9 | 3.8 | 2.7 | 3.1 | 3.3 | 3.0 | 15 |
| 4 | 4.6 | 4.5 | 4.0 | 2.6 | 3.0 | 3.4 | 3.2 | 17 |

Consistent with reported data, there were significant decreases in specific volumes of breads made from flours having wheat protein contents of 12.5% and 15%, those most used for bread making, with NFDM addition of 6%, based on the weight of the wheat flour. Breads made from flours of 10% and 17% wheat protein content showed no significant reduction in their specific volumes at the 6% level of NFDM addition. However, at the 24% level of NFDM addition there were statistically significant reductions of specific volumes of breads made from flours with wheat protein contents of either 10%, 12.5%, 15%, or 17%. These specific volume changes represented on average, a decrease of 38% from control values, twice the 19% dilution of wheat protein by the NFDM addition.

Unexpectedly, breads made from flours of either 10%, 12.5%, 15% or 17% wheat protein content with additions of NFDM of 36–48%, based on the wheat flour weight, showed a significant increase in their specific volumes from the minimum values described above at 24% levels of NFDM addition. The maximum specific volumes over the 36–48% levels of NFDM addition showed a 19% decrease on average from control values, about ⅔ of the average wheat protein dilution of 30%. This represents a reversal of the generally expected deleterious effect of NFDM on bread volume.

Considering the nutritional aspects of these breads made from flours of 10% to 17% wheat protein content to which are added NFDM in amounts of 36–48%, based on flour weight, the combination of milk proteins and wheat proteins (gluten) provide an individual essential amino acid content which closely approximate, both quantitatively and qualitatively, the FAO recommendations (1973). Decreasing the NFDM addition of levels of 24% or less has the effect of increasing the discrepancy between the essential amino acid profile of the resultant bread protein and the FAO recommendations.

A scaled-up commercial run was then performed using standard bakery equipment and practices. A dry mix of bleached wheat flour (wheat protein content, 14%) and NFDM (48% of the wheat flour weight) was prepared as follows:

| Wheat Flour | 37.5 Kg |
|---|---|
| NFDM | 18.0 Kg |

The ingredients were combined and dry blended. The resulting dry mix was put into a horizontal mixer and combined with the following ingredients:

| Sugar | 1.4 Kg |
|---|---|
| Salt | 0.7 Kg |
| Shortening | 1.4 K. |
| Compressed Yeast | 1.4 K. |
| Water | Sufficient to make dough |

The ingredients were mixed at low speed for 2 minutes and at high speed (80 RPM) for 11 minutes. The soft extensible dough formed in the mixer was transferred to an automatic dough divider and rounder, leaving a clean mixer without residual dough. The dough, scaled at 52–53 g pieces, ran smoothly through the automatic equipment without problems, proofed approximately one (1) hour and baked with initial steam application at 204° C. for 12 minutes. They were cooled, bagged and tied. Certain loaves were measured to determine specific volume by volume displacement.

Random samples were weighed. The average weight was 46.5 g, about a 10% weight loss during baking and cooling. The specific volume averaged 3.9 cc/g.

The rolls had an excellent appearance with a golden brown crust and regular shapes. They were compressible but cut easily either with a hand-held knife or an automatic slicer. They had a rich bread-like aroma. The crumb was fine, even and silky. Upon eating, the texture was soft and moist and the flavor was superior to commercial breads. This latter is a unique quality imparted by the large quantity of milk.

Nutritionally each of the rolls is equivalent in weight and caloric content to two (2) slices of bread and furnishes about ⅛ the daily requirement of protein and calcium. The protein content is not only twice that of regular bread, but is of a superior quality, comparing favorably to the FAO recommendations (Table II). In this regard, it is superior in protein content to most prepared meats but, in the case of the rolls, each contains less than 1 g of fat (less than 7% of the total calories) and no cholesterol.

TABLE II

COMPARISON OF AMINO ACID COMPOSITIONS OF BREAD (EXAMPLE I) AND A COMPLETE PROTEIN (FAO, 1973)

| Amino Acid | FAO g/100 g Protein | EXAMPLE I g/100 g Protein |
|---|---|---|
| Isoleucine | 4.0 | 5.2 |
| Leucine | 7.0 | 8.6 |
| Lysine | 5.5 | 5.3 |
| Methionine + Cystine | 3.5 | 3.3 |
| Phenylalanine + Tyrosine | 6.0 | 9.2 |
| Threonine | 4.0 | 3.7 |
| Tryptophane | 1.0 | 1.3 |
| Valine | 5.0 | 5.5 |

Samples of rolls from this and similar batches, packaged in tied polyethylene bags were stored at room temperature (22°–24° C.) and in a refrigerator (4° C). The rolls were examined daily for compressibility, surface moistness, odor, appearance, slicing characteristics and eating quality, including texture and flavor. They showed no evidence of staling over a seven (7) day period of examination in either the room temperature or the refrigerator group. The rolls remained compressible, moist to touch, retained good slicing quality with no crumbling, had fresh aroma and flavor without the flatness associated with staling. However, after about three (3) days of storage, upon eating the rolls, a sensation of dryness was noted during the first stages of chewing. This sensation disappeared with continued chewing as the portion became moistened with saliva.

Examples 5 and 6

Effect of Vegetable Gums on Loaf Volume

The effect of humectants such as guar gum or carrageenan were evaluated for their ability to prevent this sensation of dryness observed with the baked products of Examples 1-4 after storage. Using a straight dough method, eight groups each of six miniature loaves were prepared as in Examples 1-4 by the addition of salt, sugar, yeast and water to various dry mixes composed of wheat flour (12.5% protein), NFDM (24% based on flour weight) and either guar gum, 0.24% to 1.0% or carrageenan gum, 0.12% to 0.64%, all percentages based upon flour weight. In Example 5, four groups each of six loaves were prepared by the addition of salt, sugar, yeast and water to wheat flour with a 12.5% protein content blended with NFDM at a level of 24% by weight based upon 100 parts of flour, as shown in Table III. In each group, the guar gum content varied from 0 to 1.0% by weight based upon 100 parts of flour, as also shown in Table III. Four groups of six loaves each were similarly prepared for Example 6 using the same wheat flour and level of NFDM. In each group, the level of carrageenan varied from 0 to 0.64% by weight based upon 100 parts of flour. The specific volume was determined by volume displacement for each group.

TABLE III

| EXAMPLE | GUM CONTENT | | | | |
|---|---|---|---|---|---|
| | 0 | 0.12 | 0.24 | 0.64 | 1.0 |
| 5 | 2.4 | 2.9 | 2.6 | 3.1 | 3.2 |
| 6 | 2.4 | — | 3.1 | 3.1 | — | volume over the control values at all levels of gum addition.

A scaled-up commercial run was performed using standard bakery equipment. A dry mix consisting of a bleached wheat flour (wheat protein content 14%) and NFDM of 42.4% of the wheat flour weight was prepared as follows:

| Wheat Flour | 37.5 Kg |
|---|---|
| NFDM | 15.9 Kg |
| Guar Gum | 0.1-0.3 Kg |

The ingredients were combined and dry blended. The resulting flour was put into a horizontal mixer and combined with the following ingredients:

| Sugar | 1.4 Kg |
|---|---|
| Salt | 0.7 Kg |
| Shortening | 1.4 Kg |
| Oxidizing Agents | 110 ppm |
| Compressed Yeast | 1.4-2.3 Kg |
| Water | Sufficient to make dough |

The oxidizing agents utilized were 40 ppm potassium bromate, 20 ppm ADA and 50 ppm ascorbic acid.

The ingredients were mixed at low speed for 2 minutes and at high speed (80 RPM) for 9-14 minutes. The soft elastic dough formed in the mixer was transferred to an automatic dough divider and rounder, leaving a clean mixer without residual dough. The dough scaled at various weight from 52-250 g pieces ran smoothly through the automatic equipment without special treatment. The rolls, buns and loaves thus formed were panned, proofed for up to one (1) hour and baked at 204° C. for 12-25 minutes with or without initial steam application. Randomly selected samples were weighed and their specific volumes were determined by volume displacement, as in Examples 1-4. The baked pieces showed approximately a 10% weight loss during baking and cooling. Their specific volumes averaged 4 cc/g-4.4 cc/g, attributable to the higher level of NFDM in combination with the guar gum.

The baked products made from the above flour mixes containing 0.26-0.8% guar gum, based on the wheat flour weight, showed the same excellent physical and sensory characteristics as the samples made without guar gum. The baked rolls, after cooling, were packaged in tied polyethylene bags and stored at room temperature (22°-24° C.) and in a refrigerator (4° C.). They were examined daily for compressibility, surface moistness, odor, appearance, slicing characteristics and eating quality, including texture and flavor. The product showed no evidence of staling over a seven (7) day period of examination in either the room temperature or the refrigerator group. The rolls remained compressible, moist to touch, retained good slicing quality with no crumbling and had a fresh aroma and taste without the flatness associated with staling. However, the baked product made with the addition of guar gum, optimally 0.53% based on the wheat flour weight, showed no evidence of the mouth sensation of dryness previously noted with the rolls made without the addition of guar gum.

After seven (7) days the samples stored at room temperature developed mold growth because there were no preservatives or anti-mold compounds used in the manufacture of these products. Those samples stored in a refrigerator, because they did not support mold growth at this temperature, continued to be observed for a period up to 21 days. They did not stale and had acceptable physical and sensory characteristics through fourteen (14) days. Between 14 and 21 days the rolls began to show wrinkling of the upper surface because of moisture loss, a result of the inadequacy of the package seal.

Examples 7 and 8

Effect of Guar and Carrageenan Gum Blend on Loaf Volume

The same experimental procedure of Examples 5 and 6 was followed to examine the effect of a combination of guar (1.0%) and carrageenan (0.32%) gums, percentages based on flour weight. In Example 7, four groups of six loaves each were prepared by the addition of salt, sugar, yeast and water to a blend of wheat flour and NFDM at a level of 36%. The protein content of the flour varies from 10% by weight to 17% by weight, as shown in Table IV. No vegetable gum was added to these loaves, which served as a control. Four groups of six loaves each were similarly prepared for Example 8, to each of which was further added guar gum at a level of 1.0% by weight based upon 100 parts of flour and carrageenan at a level of 0.32% by weight based upon 100 parts of flour. The specific volume results are presented in Table IV. When the two gums, guar and carrageenan, are combined, their effects on loaf volume are additive and better than could be predicted from the use of either gum alone in greater amounts.

TABLE IV

| | WHEAT PROTEIN CONTENT OF FLOUR (%) | | | |
|---|---|---|---|---|
| EXAMPLE | 10 | 12.5 | 15 | 17 |
| 7 | 2.9 | 2.6 | 3.1 | 3.0 |
| 8 | 3.1 | 3.6 | 3.6 | 3.2 |

As will be readily appreciated, numerous variations and combinations of the features set forth above can be utilized without departing from the present invention as set forth in the claims. Such variations are not regarded as a departure from the spirit and scope of the invention, and all such modifications are intended to be included within the scope of the following claims.

What is claimed is:

1. A composition for preparing a bread product comprising:
   a wheat flour having a protein content between about 10% and about 17% by weight; and
   high heat non-fat dry milk solids present in an amount from about 24% to about 48% by weight per 100 parts of flour.

2. The composition of claim 1, wherein said high heat non-fat dry milk solids are present in an amount between about 36% and about 48% by weight per 100 parts of flour.

3. The composition of claim 2, wherein said high heat non-fat dry milk solids are present in an amount between about 40% and about 48% by weight per 100 parts of flour.

4. The composition of claim 1, further comprising a vegetable gum selected from the group consisting of guar gum, carrageenan, algins, karaya gum and mixtures thereof.

5. The composition of claim 4, wherein said vegetable gum is selected from the group consisting of guar gum, carrageenan and mixtures thereof.

6. The composition of claim 4, comprising from about 0.12% to about 1.70% by weight per 100 parts of flour of one or more vegetable gums.

7. The composition of claim 6, wherein said one or more vegetable gums are present in an amount between about 0.26% and about 1.40%.

8. The composition of claim 6, wherein said one or more vegetable gums comprise between about 0.24% and about 1.0% by weight per 100 parts of flour of guar gum and between about 0.12% and about 0.64% by weight per 100 parts of flour of carrageenan.

9. The composition of claim 8, wherein said guar gum is present in an amount between about 0.64% and about 1.00% by weight per 100 parts of flour and said carrageenan is present in an amount between about 0.24% and about 0.64% by weight per 100 parts of flour.

10. The composition of claim 9, wherein said guar gum is present in an amount of about 1.00% by weight per 100 parts of flour and said carrageenan is present in an amount of about 0.32% by weight per 100 parts of flour.

11. A dough made by the addition of water and a leavening agent to the composition of claim 1.

12. A dough as made in claim 11, wherein said leavening agent is yeast.

13. A baked product made from the leavened dough of claim 11.

14. A dough made by the addition of water and a leavening agent to the composition of claim 4.

15. The dough of claim 14, wherein said leavening agent is yeast.

16. A baked product made from the leavened dough of claim 14.

* * * * *

UNITED STATES PATENT AND TRADEMARK OFFICE
CERTIFICATE OF CORRECTION

PATENT NO. : 5,178,894
DATED : January 12, 1993
INVENTOR(S) : Harry W. Rudel

It is certified that error appears in the above-identified patent and that said Letters Patent is hereby corrected as shown below:

Column 2, line 52, "exphasized" should read --emphasized--.

Column 9, line 34, immediately following TABLE III, before "volume" insert --Surprisingly, loaves made with guar gum or carrageenan showed significant increases in specific--.

Signed and Sealed this

Ninth Day of November, 1993

Attest:

BRUCE LEHMAN

Attesting Officer     Commissioner of Patents and Trademarks